US008954255B1

(12) United States Patent  
Crawford

(10) Patent No.: US 8,954,255 B1  
(45) Date of Patent: Feb. 10, 2015

(54) AUTOMOBILE-SPEED CONTROL USING TERRAIN-BASED SPEED PROFILE

(71) Applicant: Robert J. Crawford, Apple Valley, MN (US)

(72) Inventor: Robert J. Crawford, Apple Valley, MN (US)

( * ) Notice: Subject to any disclaimer, the term of this patent is extended or adjusted under 35 U.S.C. 154(b) by 0 days.

(21) Appl. No.: 13/621,699

(22) Filed: Sep. 17, 2012

Related U.S. Application Data

(60) Provisional application No. 61/535,704, filed on Sep. 16, 2011.

(51) Int. Cl.  
*B60T 8/32* (2006.01)  
*G05D 1/00* (2006.01)  
*G06F 7/00* (2006.01)  
*G06F 17/00* (2006.01)

(52) U.S. Cl.  
USPC .................................. 701/93; 701/94; 701/70

(58) Field of Classification Search  
CPC .............. B60W 20/00; B60W 30/143; B60W 2720/103; B60W 30/14; B60W 30/146; B60W 40/06; Y10S 903/902  
USPC ................................................ 701/93, 70, 94  
See application file for complete search history.

(56) References Cited

U.S. PATENT DOCUMENTS

| 4,361,202 | A | 11/1982 | Minovitch |
| 4,713,988 | A | 12/1987 | Harada et al. |
| 5,208,750 | A | 5/1993 | Kurami et al. |
| 5,231,582 | A | 7/1993 | Takahashi et al. |
| 5,390,117 | A | 2/1995 | Graf et al. |
| 5,620,393 | A | 4/1997 | Minowa et al. |
| 5,709,629 | A | 1/1998 | Minowa et al. |
| 5,765,116 | A | 6/1998 | Wilson-Jones et al. |
| 5,832,400 | A | 11/1998 | Takahashi et al. |
| 6,004,592 | A | 12/1999 | Holdren et al. |
| 6,050,359 | A | 4/2000 | Mouri et al. |
| 6,085,137 | A | 7/2000 | Aruga et al. |
| 6,098,005 | A | 8/2000 | Tsukamoto et al. |
| 6,185,492 | B1 | 2/2001 | Kagawa et al. |
| 6,253,139 | B1 | 6/2001 | Borodani et al. |
| 6,256,561 | B1 | 7/2001 | Asanuma |
| 6,314,348 | B1 | 11/2001 | Winslow |
| 6,405,132 | B1 | 6/2002 | Breed et al. |
| 6,473,678 | B1 | 10/2002 | Satoh et al. |
| 6,489,887 | B2 | 12/2002 | Satoh et al. |
| 6,493,619 | B2 | 12/2002 | Kawazoe et al. |
| 6,556,905 | B1 | 4/2003 | Mittelsteadt et al. |
| 6,865,457 | B1 | 3/2005 | Mittelsteadt et al. |
| 6,895,318 | B1 | 5/2005 | Barton et al. |
| 6,977,630 | B1 | 12/2005 | Donath et al. |

(Continued)

*Primary Examiner* — Calvin Cheung  
*Assistant Examiner* — Paula L Schneider  
(74) *Attorney, Agent, or Firm* — Crawford Maunu PLLC

(57) ABSTRACT

Aspects of the present disclosure are directed towards hysteresis engaged vehicle cruise control apparatuses, and systems and methods that facilitate energy efficiency as a function of external energy obstacles. The method and system includes an adaptable terrain-based speed profile and terrain-based work function for maintaining a vehicle at a desired speed and selected speed range. The speed profile further includes a terrain-based driving preference associated with an identifier that identifies a particular driver and driving profile. Vehicle-related data is generated with regard to energy efficiency obstacles, and vehicle speed is automatically adjusted based on this data to facilitate fuel economy. In certain embodiments, vehicle-related data is sent to a cloud-computing system for processing. In other embodiments, the desired speed and terrain-based speed profile is influenced by user or external inputs.

24 Claims, 3 Drawing Sheets

(56) References Cited

U.S. PATENT DOCUMENTS

| | | |
|---|---|---|
| 7,191,061 B2 | 3/2007 | McKay et al. |
| 7,216,023 B2 | 5/2007 | Akita |
| 7,510,038 B2 | 3/2009 | Kaufmann et al. |
| 7,555,367 B2 | 6/2009 | Kuge |
| 7,584,033 B2 | 9/2009 | Mittelsteadt et al. |
| 7,634,331 B2 | 12/2009 | Kuge |
| 7,742,863 B2 | 6/2010 | Brattberg |
| 7,765,066 B2 | 7/2010 | Braeuchle et al. |
| 8,392,064 B2 | 3/2013 | Thrun et al. |
| 2003/0046021 A1 | 3/2003 | Lasky et al. |
| 2004/0193374 A1 | 9/2004 | Hac et al. |
| 2004/0262063 A1 | 12/2004 | Kaufmann et al. |
| 2005/0267684 A1 | 12/2005 | Kawakami et al. |
| 2006/0030987 A1 | 2/2006 | Akita |
| 2006/0047390 A1 | 3/2006 | Scherl et al. |
| 2007/0021889 A1 | 1/2007 | Tsuchiya |
| 2009/0048738 A1 | 2/2009 | Iwazaki et al. |
| 2009/0259354 A1* | 10/2009 | Krupadanam et al. .......... 701/22 |
| 2011/0231063 A1 | 9/2011 | Kim |
| 2011/0234427 A1* | 9/2011 | Ingram et al. .............. 340/995.1 |
| 2011/0246043 A1* | 10/2011 | Maruyama ...................... 701/96 |
| 2011/0276216 A1* | 11/2011 | Vaughan ........................ 701/29 |

\* cited by examiner

AUTOMOBILE-SPEED CONTROL USING TERRAIN-BASED SPEED PROFILE

RELATED PATENT DOCUMENT

This patent document claims benefit under 35 U.S.C. §119 of U.S. Provisional Patent Application Ser. No. 61/535,704 and filed on Sep. 16, 2011; this patent document is fully incorporated herein by reference.

BACKGROUND

The increased cost of energy has made energy efficiency an important aspect of personal and business transportation. The use of vehicles as the main form of transportation represents a large use of energy. Whether the energy source is gasoline or an alternative fuel source, a monetary and environmental cost is the consequence. Increasing energy efficiency can greatly decrease the resulting monet and environmental harm.

During vehicle use, an inefficient use of energy occurs as a result of minor variations in engine efficiency in order to maintain speed. Cruise control, as installed in most modern vehicles, has been an attempt to control speed with minimal operator input. However, the cruise control mechanism neglects the efficient use of energy. A vehicle operator has the ability to consciously control speed and RPMs.

SUMMARY OF THE INVENTION

Aspects of the present disclosure relate to cruise-control of an automobile that in anticipation/detection of elevation changes on the roadway and a hysteresis engaged vehicle cruise control to facilitate energy efficiency as a function of external energy obstacles.

For instance, certain aspects of the present disclosure are directed towards apparatuses, system, and methods that in response to receiving a selection of a desired speed for a vehicle, use a terrain-based speed profile and a terrain-based work function for the vehicle for maintaining the vehicle at the desired speed, including the desired speed and a selected speed range, for a current driving mode. The status of expected energy-efficiency obstacles is assessed. The obstacles are associated with a roadway corresponding to the profile. The vehicle is maintained at the desired speed automatically. In response to assessing the status of expected energy-efficiency obstacles, the vehicle's speed is automatically adjusted relative to the desired speed to facilitate fuel economy based on the terrain-based driving-speed profile and the terrain-based work function.

Additional apparatuses, system, and methods are directed towards assessing a desired speed for the vehicle, and assessing a terrain-based work function of the vehicle for maintaining the vehicle at the desired speed as a function of a terrain-based speed profile. The terrain-based speed profile includes the desired speed and a selected speed range for the current driving mode. A data set is generated based on expected energy-efficiency obstacles, useful for operating the vehicle at the desired speed automatically.

BRIEF DESCRIPTION OF THE DRAWINGS

The disclosure may be more completely understood in consideration of the following detailed description of various embodiments of the disclosure in connection with the accompanying drawings, in which.

Figure 1:
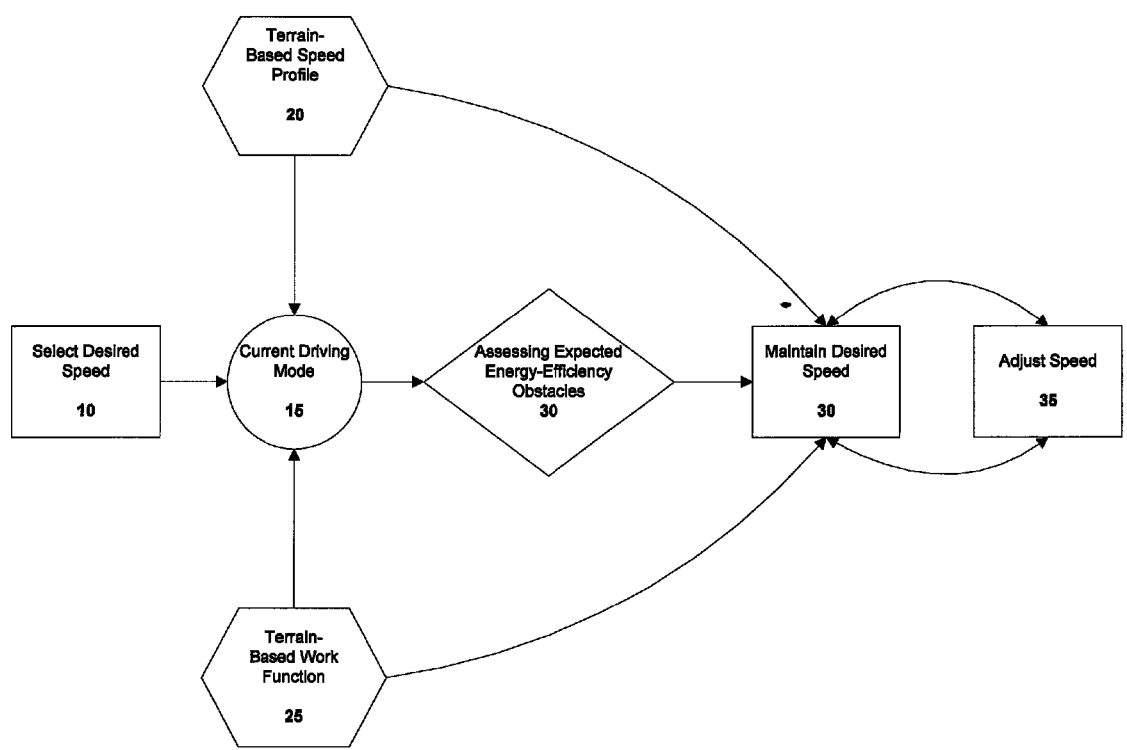
FIG. 1 shows an example of hysteresis speed control, consistent with example embodiments in the present disclosure.

While the disclosure is amendable to various modifications and alternative forms, specifics thereof have been shown by way of example in drawings and will be described in detail. It should be understood, however, that the intention is not to limit the disclosure to the particular embodiments described. On the contrary, the intention is to cover all modifications, equivalents, and alternatives falling within the scope of the disclosure, including aspects defined by the claims.

DETAILED DESCRIPTION

Aspects of the present disclosure are believed to relate to the increased energy efficiency of a vehicle through hysteresis and/or elevation sensing principles. Utilizing hysteresis principles to automatically and continuously alter the speed of a vehicle by maintaining engine RPMs increases energy efficiency, in some instances, by as much as 10-25%.

In order to maintain high energy efficiency, the aspects are used to develop a terrain-based speed profile based on a number of external indicators. Generally, the term terrain-based speed profile refers to the energy efficient objective which is to be maintained. The terrain-based speed profile is influenced by user tendencies. A number of different users may operate the same vehicle. Different users have different approaches to travel, and travel different places. For example, the primary vehicle user may consistently travel to the same location, and proceed as quickly as possible disregarding energy efficiency. That same user may also travel to a location, but travel at a relaxed pace.

Certain aspects of the present disclosure are directed towards apparatuses, system, and methods that in response to receiving a selection of a desired speed for a vehicle, use a terrain-based speed profile and a terrain-based work function for the vehicle for maintaining the vehicle at the desired speed, including the desired speed and a selected speed range, for a current driving mode. The status of expected energy-efficiency obstacles is assessed. The obstacles are associated with a roadway corresponding to the profile. The vehicle is maintained at the desired speed automatically. In response to assessing the status of expected energy-efficiency obstacles, the vehicle's speed is automatically adjusted relative to the desired speed to facilitate fuel economy based on the terrain-based driving-speed profile and the terrain-based work function.

Additional apparatuses, system, and methods are directed towards assessing a desired speed for the vehicle, and assessing a terrain-based work function of the vehicle for maintaining the vehicle at the desired speed as a function of a terrain-based speed profile. The terrain-based speed profile includes the desired speed and a selected speed range for the current driving mode. A data set is generated based on expected energy-efficiency obstacles, useful for operating the vehicle at the desired speed automatically.

As a result of the many factors influencing the fuel efficiency of a vehicle, aspects of the present disclosure are directed towards automatically adjusting, and adaptively learning to provide an adaptable terrain-based speed profile. Certain aspects of the present disclosure utilize the vehicle's existing fuel economy work functions to measure fuel economy during travel, and updates based on the factors listed above. In an example embodiment, frequently traveled routes are analyzed based on a number of factors, including, but not limited to the time of day and the environmental conditions, such that a terrain-based speed profile designed is implemented to best improve energy efficiency.

Hysteresis refers to systems or methods that exhibit path dependence. Path dependence occurs where a current state of a system depends on the path utilized to achieve that state. A control utilizing hysteresis takes into account the data leading up to a set point, and will delay a change to incorporate the predicted future movement of the data. As a result, the data will slowly adjust to the set point, minimizing control changes. A control without hysteresis signals a change based upon reaching a set data point. This could result in rapid amount of control changes as the data hovers around the set data point. More generally, hysteresis allows the delay of the effect of changing forces acting on a body. As applied to a moving vehicle, forces that act to accelerate or decelerate the vehicle are delayed in order to gain fuel efficiency.

An example of a control utilizing hysteresis is a thermostat. A thermostat is set to engage a heating element once the temperature falls below the set point. Rather than engaging the heating element each time the temperature falls below a set point, the thermostat allows the temperature to fall a nominal amount below the set point, taking into account the data history, and engages the heating element until a temperature nominally above the set point is reached. Without hysteresis, the heating element would turn on and off rapidly around the set point. Hysteresis takes into account the data history, and allows for gradual changes.

In an example embodiment, the terrain-based speed profile includes multiple available modes. The modes correspond to different levels of speed variation during energy-efficiency obstacles. Upside hysteresis refers to an increase in speed above the selected desired speed. Downside hysteresis refers to a decrease in speed below the selected desired speed. In the first example driving mode, Driving Mode 1, the downside hysteresis during an energy obstacle is approximately 5 MPH, and the upside hysteresis is a nominal amount above the downside hysteresis (1-2 MPH). The result of Driving Mode 1 is an average speed, through the energy obstacle, less than selected desired speed of travel. Driving Mode 2, in an example embodiment, has equal upside and downside hysteresis, such that the average speed is approximately equal to the selected desired speed of travel. Driving Mode 3 adjusts speed prior to an energy obstacle. For example, if an increase in elevation is sensed, Driving Mode 3 will nominally increase speed (1-2 MPH) above the selected desired speed. This builds momentum in preparation for the increase in elevation. During the elevation increase, Driving Mode 3 decreases speed approximately 5 MPH. The corresponding upside hysteresis is approximately equal to the downside hysteresis. The resulting average speed through the energy efficiency obstacle is approximately equal to the selected desired speed.

In an example embodiment, selecting the terrain-based speed profile is automatic-geography-based or a manual user selection. One driving mode is the default selection for the terrain-based speed profile. The automatic-geography-based selection is influenced by user preferences and tendencies. The user is known by a biometric identifier. The mode is further influenced by the location of the vehicle. For example, if the vehicle is traveling in a rural environment, and the driver prefers to maintain average speed, the automatic-geography base selection will choose Driving Mode 2 or Driving Mode 3. The vehicle operator is able to manually select the driving mode used to implement the terrain-based speed profile.

The terrain-based speed profile refers to an overall energy efficiency method, the terrain-based work function refers to the current energy state of the vehicle during travel. The terrain-based work function is determined based on a number of indicators, including engine RPM. In various embodiments, a state of decreased energy efficiency is evidenced by an increase in RPMs outside a critical range. In the same embodiment, decreased energy efficiency is evidenced by increased RPMs exceeding the critical range. The critical range is developed as a result of calculating the specific vehicle's terrain-based speed profile, but generally, the optimal range is between 1000 and 2000 RPM. In the event of increased energy efficiency, an increase in speed is allowed, while maintaining engine RPM. In the event of decreased energy efficiency, a decrease in speed is allowed, and engine RPM is maintained. The resultant speed changes are maintained within the vehicle's optimal energy efficiency range as determined by the terrain-based speed profile. For further information regarding manners in which vehicle engine gears can be controlled for fuel efficiency, reference may be made to U.S. Pat. No. 7,742,863, entitled "Method and Device for Controlling a Work Function of a Vehicle and a Work Vehicle Comprising the Control Device."

The terrain-based work function varies for each vehicle based on a number of factors including, but not limited to: vehicle weight, vehicle aerodynamics, and engine efficiency. Furthermore, the energy efficiency of a given vehicle will vary on current conditions. For example, a vehicle's energy efficiency will differ throughout the life of the vehicle's tires. Therefore, the terrain-based speed profile will differ throughout the life of a vehicle. Additionally, the terrain-based work function will vary from day-to-day due to environmental factors.

The terrain-based speed profile will terminate if a mitigation issue occurs. Vehicle operator breaking is a mitigation issue that terminates the speed profile. In an example embodiment, decreased speed terminates the terrain-based speed profile. In certain embodiments, a GPS or partial-GPS device will provide an alert regarding a traffic event, and terminate the profile. In more specific embodiments, a vehicle's telematic system will alert of a safety issue, and terminate the terrain-based speed profile. In another more specific embodiment, a vehicle's front and rear sensors are utilized to monitor the proximity of other vehicles, and terminate the terrain-based speed profile if speed change is unsafe or inefficient. In another embodiment, the vehicle will sense the current load of passengers and cargo, and terminate the terrain-based speed profile if energy efficiency cannot be maintained.

In a more specific embodiment, recorded data will be relayed to a cloud-computing system (such as implemented via GM's On-Star service) which automatically processes vehicle-related data. The cloud computing system analyzes the data, and provides telematic-type information for the driver. Telematics refers generally to an integrated telecommunications and information processing system as integrated into and/or recorded by a vehicle. Such information includes for example and without limitation, user profile information, updates on optimizing the vehicle's work function (such as fuel efficiency generally or over certain types of terrain; need for change of oil, oil filter, tires; and updates on energy efficiency suggestions (e.g., new routes) for frequently traveled routes).

In different embodiments, the cloud-computing system processes data on behalf of different entities, depending on how a subscriber to a service-provider for the cloud-computing system is registered to be serviced. In one embodiment, the cloud-computing system processes data on behalf of a driver and at least one related vehicle. This approach addresses needs of a driver interested in monitoring and/or optimizing fuel efficiency for the vehicle or vehicles he/she drives. This approach also addresses needs of an owner of numerous vehicles (e.g., the head of a household or an employer) who permits at least one user (family member or employee) to drive designated vehicles, thereby monitoring and/or optimizing fuel efficiency for the vehicle or vehicles he/she owns. In another related embodiment, the cloud-computing system processes data on behalf of a vehicle and another entity (driver, user, company). The cloud-computing system is used and/or monitored to track management and/or use of such entity-vehicle pairs (e.g., certain driver(s) (or owner(s)) of the vehicle, designated vehicle(s) for a certain driver) for ensuring a variety of conditions and purposes (e.g., insurance safety, fuel efficiency, needed vehicle servicing, etc.).

After developing the terrain-based speed profile, energy obstacles are sensed. In certain embodiments, this is accomplished in an energy obstacle indication module. In certain embodiments, the energy obstacle indication module includes determining vehicle location based on a GPS device, and reading the location against a terrain map to determine the location of energy efficiency obstacles. In another embodiment, the energy obstacle indication module will utilize information from a GPS enable device, such as a smartphone, to determine vehicle location. The location of the vehicle is combined with terrain information, and energy efficiency obstacles are found. In yet another embodiment, upcoming energy obstacles are determined utilizing a vehicle's existing e-compass and terrain maps.

In both instances, these aspects are continuously repeated. The path dependence exhibited by hysteresis automatically adjusts speed as a result of the current speed of the vehicle, and the estimated energy drain from the energy obstacle. The repeating loop allows the vehicle to continuously update the work function in order to maintain maximum energy efficiency. The hysteresis loop will repeat until the work function of the vehicle indicates a maintained state of energy efficiency.

Maintained energy efficiency is indicative of an ongoing energy obstacle, or the end of an energy obstacle. If the speed of the vehicle is within the set optimal range, this will signal the end of an energy obstacle. At this point, the vehicle will automatically proceed at the desired speed, and will again sense for an energy obstacle. If the vehicle is not traveling at the desired speed, the energy obstacle is ongoing. The current vehicle work function is determined again, and maintains the energy efficient state until the desired speed is reached.

Turning now to the figures, in FIG. 1 the vehicle operator selects the desired speed 10. The desired speed is selected using a vehicle's current cruise control mechanism. A terrain-based speed profile 20 and a terrain-based work function 25 influence the current driving mode 15. Variance inputs, including user preferences, influence the terrain-based speed profile 20. Vehicle specific energy indicators alter the terrain-based work function 25. After choosing the terrain-based speed profile 20, the expected energy-efficiency obstacles 30 is assessed. The terrain-based speed profile 20 is implemented based on the expected energy-efficiency obstacles. The terrain-based speed profile 20 and terrain-based work function 25 maintain desired speed 30, and adjust speed 35 as necessary to implement the terrain-based speed profile 20.

Figure 2:
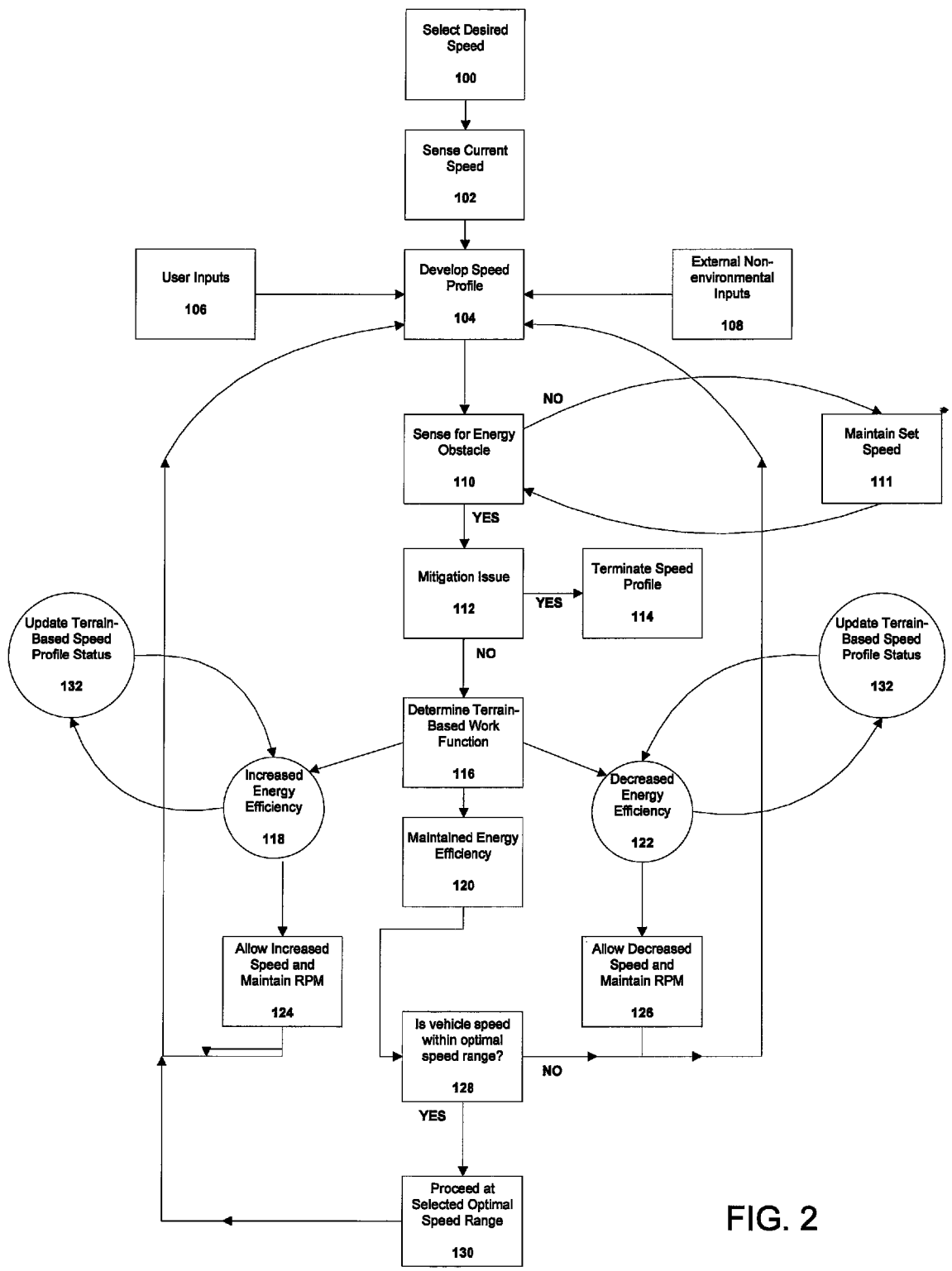
FIG. 2 shows implementation of an example embodiment of a hysteresis speed control, consistent with example embodiments in the present disclosure.

Various embodiments of the present disclosure are shown in FIG. 2. A desired speed 100 is selected based on user input. The current speed 102 of the vehicle is sensed as a factor in deciding the appropriate terrain-based speed profile 104. In certain embodiments, the terrain-based speed profile 104 is influenced by various user inputs 106 and external non-environmental inputs 108. The terrain-based speed profile 104 generated provides a general design for energy conservation.

The terrain-based speed profile 104 is implemented as a result of sensed energy obstacles 110. If an energy obstacle 110 is not sensed, the desired speed 111 will be maintained. If an energy obstacle 110 is sensed, the possibility of a mitigation issue 112 is determined. If a mitigation issue 112 is sensed, the terrain-based speed profile 114 is terminated. A mitigation issue 112 inhibits the proper implementation of the terrain-based speed profile 104 such that energy is not conserved.

If a mitigation issue 112 is not a concern, the work function 116 of the vehicle is developed. The work function describes the current energy state of the vehicle: increased energy efficiency 118, decreased energy efficiency 122, or maintained energy efficiency 120. In an example embodiment, the changes in energy efficiency are determined as a function of a change in engine RPMs and vehicle speed. In this embodiment, increased energy efficiency 118 is indicated by a decrease in RPM while maintaining speed, whereas decreased energy efficiency 122 is indicated by the opposite occurrence. During periods of increased efficiency 118, the throttle control increases speed and maintains the energy efficient RPM 124. In periods of decreased energy efficiency 122, the throttle control decreases speed in order to maintain the energy efficient RPM 126. In both instances of increased energy efficiency 118 and decreased energy efficiency 122, the terrain-based speed profile status 132 is updated.

Upon altering vehicle speed, an energy obstacle 110 is sensed for again, creating a loop, and the appropriate hysteresis lag in speed.

If a state of maintained energy efficiency 120 is indicated, it will be determined whether the vehicle is traveling at the desired speed 128. If the vehicle is traveling at the desired speed, the energy obstacle is completed, and the vehicle will proceed at the desired speed 130, and again an energy obstacle 110 is sensed for. If the vehicle is not traveling at the desired speed, although energy efficiency is maintained, the energy obstacle is not likely completed, an energy obstacle 110 is sensed for again.

Figure 3:
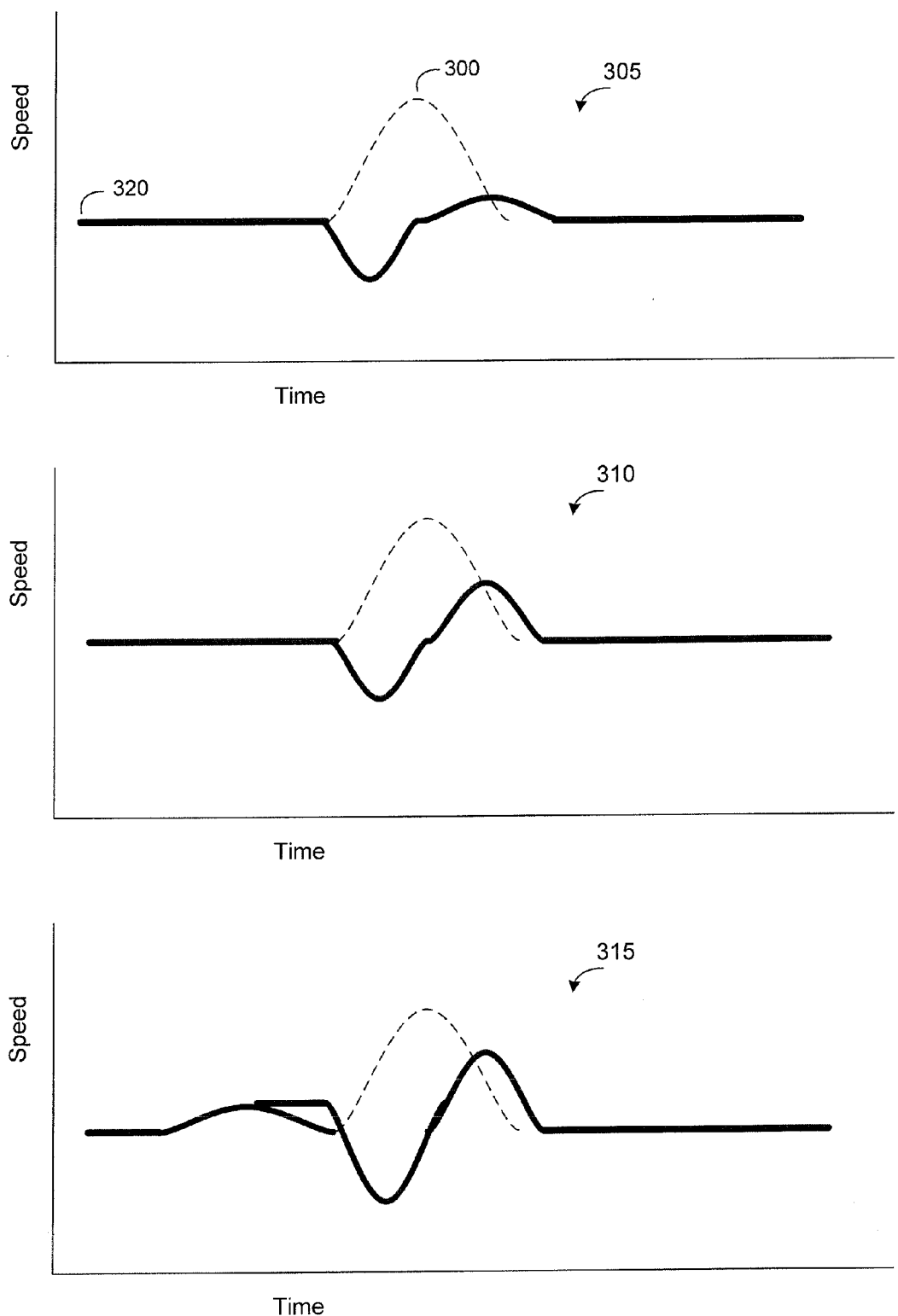
FIG. 3 shows different available terrain-based driving modes, and implementation thereof for the same energy-efficiency obstacle.

Example implementation of a terrain-based speed profile is shown in FIG. 3. The different terrain-based driving modes, Driving Mode 1 305, Driving Mode 2 310, and Driving Mode 3 315, are shown responding to the same energy efficiency obstacle, which in this example is a hill 300. The vehicle travels at the desired set speed 320 is shown before and after the energy-efficiency obstacle. The terrain-based work function, as implemented in Driving Mode 1 305, decreases speed a set amount, for example 5 MPH. The speed decrease, the downside hysteresis, is influenced by the terrain-based work function maintaining RPM, but the decrease does not exceed 5 MPH in Driving Mode 1 305. After reaching the climax of the hill 300, the vehicle increases speed, the upside hysteresis. The nominal upside hysteresis in Driving Mode 1 is 2 MPH. The result of Driving Mode 1 305 is an average speed slightly below the desired set speed 320.

Driving Mode 2 310 is shown approaching the same hill (shown by dashed lines). Driving Mode 2 310 has a maximum upside hysteresis equal to that of the downside hysteresis, which is double the nominal upside hysteresis in Driving Mode 1 305. The result is an average speed approximately equal to that of the desired set speed 320.

Driving Mode 3 315 ideally is implemented in situations where encountering other vehicles is not likely, such as country roads. In these instances, the speed is increased leading up to the energy-efficiency obstacle a nominal amount, approximately 2 MPH. The downside hysteresis decreases speed a maximum of 7 MPH, and the upside hysteresis increases speed up to 5 MPH. The result is an average speed 325 approximately equal to the desired speed 320.

Aspects of the present disclosure can be installed on a number of different vehicles, utilizing on-board processing arrangements, and used in a number of different situations. Over the course of a long journey, a large amount of energy obstacles are encountered. The most prevalent type of energy obstacles are changes in elevation. On long trips, cruise control is heavily used to lessen the operator's involvement and allowed for a more relaxed ride. The longer the journey, the more inefficient overcoming of energy obstacles will add to transportation costs. Utilizing a hysteresis enable system would save transportation costs by overcoming energy obstacles more efficiently. Using elevation changes as an example, a loaded semi-truck would likely maintain a constant speed through the uphill and downhill. The standard cruise control system installed on a semi-truck does not account for energy use, therefore, the same speed is maintained on increases in elevation and decreases in elevation. A hysteresis enabled system automatically adjusts vehicle speed downward during an increase in elevation, and during the resulting decrease in elevation, the system allows for an increase in speed, while maintaining an energy efficient state. After the elevation change is completed, the system automatically settles into the originally selected, energy efficient speed, and continues on the journey until the next elevation change, or energy obstacle, is sensed.

A person does not need to drive a semi-truck across the country to appreciate the advantages and benefits of the aspects of the present disclosure. In an example embodiment, the system incorporates a GPS device. The device ties into the system to provide information of upcoming energy obstacles. For example, the system will sense upcoming traffic events. During traffic events, the hysteresis enabled system will automatically terminate the energy saving measures. Additionally, energy obstacles are encountered even during a minor commute. Although the energy savings are not as prevalent as a cross-country journey, the net effect of the savings over a month's worth of commutes provides similar energy savings.

In another example embodiment, the integration of calendar inputs influences the choice of energy efficiency. Complete energy efficiency is not always desired. Time is not always available. In those instances, an external calendar input factors into the decision of the level of energy efficiency. In such an instance, energy efficiency is maximized as is travel time.

In addition to external environmental inputs, user inputs influence the energy saving method. As a result of user input, the system takes into account user tendencies and preferences, and develops a profile for each vehicle operator. The user profile will adapt over time to take into account user tendencies, and lessen user involvement as the system accumulates information.

Another important advantage of the present disclosure occurs when transitioning between urban and rural travel. During urban travel, due to the larger collection of vehicles, engaging the energy saving method may be unproductive. In an example embodiment, GPS or telematics will alert the system of location. Transition from a rural location to a more urban location will shift from a higher energy efficient mode to a lower energy efficient mode or terminate energy saving method entirely. Additionally, transition for an urban location to a rural location will signal the method to change to a more energy efficient terrain-based speed profile.

Various modules may be implemented to carry out one or more of the operations and activities described herein and/or shown in the figures. In these contexts, a "module" is a circuit that carries out one or more of these or related operations/activities. For example, in certain of the above-discussed embodiments, one or more modules are discrete logic circuits or programmable logic circuits configured and arranged for implementing these operations/activities, as in the circuit modules shown in the Figures. In certain embodiments, the programmable circuit is one or more computer circuits programmed to execute a set (or sets) of instructions (and/or configuration data). The instructions (and/or configuration data) can be in the form of firmware or software stored in and accessible from a memory (circuit).

Based upon the above discussion and illustrations, those skilled in the art will readily recognize that various modifications and changes may be made to the present invention without strictly following the exemplary embodiments and applications illustrated and described herein. Such modifications do not depart from the true spirit and scope of the present invention, including that set forth in the following claims.

What is claimed is:

1. A method comprising:
   in response to receiving a selection of a desired speed for a vehicle;
   utilizing a terrain-based speed profile and a terrain-based work function for the vehicle for maintaining the vehicle at the desired speed, including the desired speed and a selected speed range, for a current driving mode, wherein the terrain-based speed profile includes a terrain-based driving preference for a type of driving, the type of driving accounting for an amount of hysteresis in adjusting the speed of the vehicle relative to the desired speed;
   assessing, by at least one programmable logic circuit, discrete logic circuit or computer circuit, the status of expected energy-efficiency obstacles associated with a roadway corresponding to the terrain-based speed profile;
   maintaining, by the at least one programmable logic circuit, discrete logic circuit or computer circuit, the vehicle at the desired speed automatically;
   in response to the step of assessing the status of expected energy-efficiency obstacles, automatically adjusting the speed of the vehicle relative to the desired speed to facilitate fuel economy based on the terrain-based speed profile and the terrain-based work function; and
   wherein the desired speed and selected speed range for the current driving mode are provided by respective user-operated inputs, whereby the desired speed is in the selected speed range for the current driving mode.

2. The method of claim 1, wherein the terrain-based speed profile further includes a terrain-based driving preference associated with an identifier indicative of a particular driver.

3. The method of claim 1, wherein the speed profile includes a terrain-based driving preference associated with an identifier indicative of a type of driving for a particular driver, the type of driving accounting for an amount of hysteresis in adjusting the speed of the vehicle relative to the desired speed.

4. The method of claim 3, wherein the identifier indicative of a particular driver includes at least one of: key-ignition identifier recognition, wireless-device communication identification, passcode or voice or other driver biometric.

5. The method of claim 1, wherein the speed profile includes at least two terrain-based driving modes associated in adjusting the speed of the vehicle relative to the desired speed, one of the driving modes accounting for a minimal or nominal amount of upside-speed hysteresis and the other of the driving modes accounting for an amount of upside-speed hysteresis which is at least twice the minimal or nominal amount.

6. The method of claim 1, wherein the terrain-based work function provides an operating RPM range for an engine in the vehicle.

7. The method of claim 1, wherein the terrain-based speed profile is utilized during an energy-efficiency obstacle manifesting as an increase in elevation and resulting decrease in elevation by decreasing speed within the selected speed range during the increase in elevation, increasing speed within the selected speed range during the decrease in elevation, and resuming the desired speed for the vehicle when level elevation is regained.

8. The method of claim 1, wherein the terrain-based speed profile is utilized during an energy-efficiency obstacle manifesting as a decrease in elevation and resulting increase in elevation by increasing speed within the selected speed range during the decrease in elevation, decreasing speed within the selected speed range during the increase in elevation, and resuming the desired speed for the vehicle when level elevation is regained.

9. The method of claim 1, wherein the terrain-based speed profile is assessed, in response to a mitigation issue, as to whether to maintain the vehicle at the desired speed, or revert out of the speed control work function.

10. The method of claim 9, wherein the mitigation issue that reverts out of the speed control work function is one of: an external environmental input, low speeds or traffic incidents.

11. The method of claim 1, wherein the terrain-based speed profile is terminated at an indication of a mitigation issue, including traffic incidents, low speed, or user termination.

12. The method of claim 1, wherein assessing the status of expected energy-efficiency obstacles includes determining location of the vehicle based on GPS, and locating energy obstacles from a terrain map.

13. The method of claim 1, wherein assessing the status of expected energy-efficiency obstacles includes determining location of the vehicle based on GPS enabled device, and locating energy obstacles from a terrain map.

14. The method of claim 1, wherein assessing the status of expected energy-efficiency obstacles includes determining location of the vehicle based on the vehicle's e-compass, and locating energy obstacles from a terrain map.

15. The method of claim 1, wherein the terrain-based speed profile is developed from user inputs, including varying levels of energy efficiency, and external non-environmental inputs, and an automatically updated user profile.

16. The method of claim 1, wherein the terrain-based speed profile is influenced by external calendar inputs of upcoming events such that energy efficiency is sacrificed in order to arrive at the event punctually.

17. The method of claim 1, wherein the terrain-based speed profile is influenced by external telematic indicators, including traffic and accident reports, and terminated when energy efficiency is no longer feasible.

18. The method of claim 1, wherein the current driving mode is one of a plurality of driving modes selected manually by a user-operated input.

19. The method of claim 1, wherein the current driving mode is one of a plurality of driving modes selected manually by a user-operated input that is selected automatically in response to the terrain-based speed profile.

20. The method of claim 1, wherein the current driving mode is selected as one of a plurality of modes including at least two of the following modes:
- a first driving mode in which the vehicle is maintained to travel at the desired speed before and after energy-efficiency obstacles with the desired speed decreasing before a peak of the energy-efficiency obstacle as a function of a work function that maintains a consistent RPM parameter;
- a second driving mode that uses a maximum upside hysteresis that is double a normal hysteresis when the vehicle travels before or absent an energy-efficiency obstacle; and
- a third driving mode where the presence of other vehicles that would interfere with speed adjustments is not anticipated where the selected speed range is increased relative to the selected speed range for another of the driving modes.

21. A method comprising:
assessing, by a first at least one programmable logic circuit, discrete logic circuit or computer circuit, a desired speed for a vehicle;
assessing, by a second at least one programmable logic circuit, discrete logic circuit or computer circuit, a terrain-based work function of the vehicle, wherein a terrain-based speed profile includes a terrain-based driving preference for a type of driving, the type of driving accounting for an amount of hysteresis in adjusting the speed of the vehicle relative to the desired speed;
maintaining the vehicle at the desired speed as a function of the terrain-based speed profile, including the desired speed and a selected speed range, for a current driving mode;
generating, by a third at least one programmable logic circuit, discrete logic circuit or computer circuit, a data set, based on expected energy-efficiency obstacles;
utilizing said data set to operate the vehicle at the desired speed automatically; and
wherein the desired speed and selected speed range for the current driving mode are provided by respective user-operated inputs, whereby the desired speed is in the selected speed range for the current driving mode.

22. The method of claim 21, wherein the generated data set is accomplished by storing data on the vehicle's internal memory storage, and communicating the data set to a cloud in which the data will be analyzed.

23. The method of claim 22, wherein the generated data set is delivered to the cloud via an on-board vehicle telematics system.

24. The method of claim 22, wherein the generated data set is different for each vehicle user, where the vehicle user is identified using at least one of the following indicators: key-ignition identifier recognition, wireless-device communication identification, passcode or voice or other driver biometric.

* * * * *